United States Patent [19]

Morimoto

[11] 4,403,750
[45] Sep. 13, 1983

[54] BAIL LATCHING AND RELEASING MECHANISM FOR SPINNING REEL

[75] Inventor: Yoshinori Morimoto, Fuchu, Japan

[73] Assignee: Ryobi, Ltd., Hiroshima, Japan

[21] Appl. No.: 373,186

[22] Filed: Apr. 29, 1982

Related U.S. Application Data

[63] Continuation of Ser. No. 138,633, Apr. 8, 1980, abandoned.

[30] Foreign Application Priority Data

Apr. 9, 1979 [JP] Japan .............................. 54-47153[U]
Apr. 9, 1979 [JP] Japan .............................. 54-47164[U]

[51] Int. Cl.³ ............................................. A01K 89/01
[52] U.S. Cl. ............................................. 242/84.2 G
[58] Field of Search .................. 242/84.2 G, 84.21 R, 242/84.2 F

[56] References Cited

U.S. PATENT DOCUMENTS 2,942,798 6/1960 Alinari ........................... 242/84.2 G
4,098,473 7/1978 Sazaki ........................... 242/84.2 G
4,147,313 4/1979 Sazaki ........................... 242/84.2 G
4,202,508 5/1980 Ishida et al. ................... 242/84.2 G Primary Examiner—Billy S. Taylor
Attorney, Agent, or Firm—Sughrue, Mion, Zinn, Macpeak and Seas

[57] ABSTRACT

A bail latching and releasing mechanism is disclosed, wherein the mechanism is assembled in either one of support housings symmetrically disposed on diametrically opposite side of a rotor. The mechanism includes a generally L-shaped kick lever slidably disposed in one of the support housings, a dead-point spring, an operation cam and a compression spring. Both ends of the bail arm are coupled to rotary discs each rotatably secured to the respective support housings. One of the rotary discs and the kick lever are spring-biased by the dead-point spring to selectively maintain the bail arm in its fishing line rewinding and releasing position. The compression spring is adapted to urge said kick lever toward the direction away from the operation cam.

9 Claims, 6 Drawing Figures

BAIL LATCHING AND RELEASING MECHANISM FOR SPINNING REEL

This is a continuation, of application Ser. No. 138,633, filed Apr. 8, 1980, and now abandoned.

BACKGROUND OF THE INVENTION

This invention relates to a bail latching and releasing mechanism for an arm spool type of a spinning reel.

In this type of spinning reel, bail latching and releasing action is necessitated to release and rewind the fishing line. The bail arm is manually shifted to its fishing line releasing position, and the bail arm can be automatically returned to its fishing line rewinding position by the internal kicking action upon rotation of a rotor.

The prior art bail control mechanisms are generally characterized by a number of exposed and protruding parts of sharp and irregular shape. Therefore, it is rather difficult to assemble these complicated mechanical parts, and the production costs are rather high. Further, high dimensional accuracy is required to obtain stabilized bail turning action.

SUMMARY OF THE INVENTION

It is therefore an object of this invention to overcome the above-mentioned drawbacks and disadvantages and to provide an improved spinning reel having an improved bail latching and releasing mechanism.

These and other objects are attained in accordance with the present invention by providing a compact bail latching and releasing mechanism in either one of the support housings. Both ends of the bail arm are coupled to rotary discs each rotatably secured to the respective support housings. The bail latching and releasing mechanism include a kick lever slidably disposed along an axial direction of the rotor, a dead-point spring having one end connected to one of the rotary discs and the other end connected to the kick lever, and a compression spring. The kick lever has one end adapted to be abutted on or engaged with a boss protruded from the rotary disc and has the other end adapted to be brought into abutment with a stationary operation cam during rotation of the rotor when the bail arm is maintained in its fishing line releasing position. When the bail arm is maintained in its fishing line rewinding position, the other end of the kick lever is offset from the cam because of the displacement of the kick lever. The dead-point spring urges the rotary disc to rotate so as to selectively maintain the bail arm at its fishing line rewinding or releasing position. This urging direction is changed toward opposite direction in response to the rotational direction of the rotary disc to thus selectively maintain the bail arm. The compression spring is connected to the kick lever to normally urge the kick lever to the direction so as to provide a given distance between the operation cam and the kick lever. The compression spring also provides bail turning force during its compressed state because of the displacement of the kick lever.

These and other objects of this invention will become apparent from the description of the drawings and the preferred embodiments which follow.

DETAILED DESCRIPTION OF THE PREFERRED EMBODIMENTS

Figure 1:
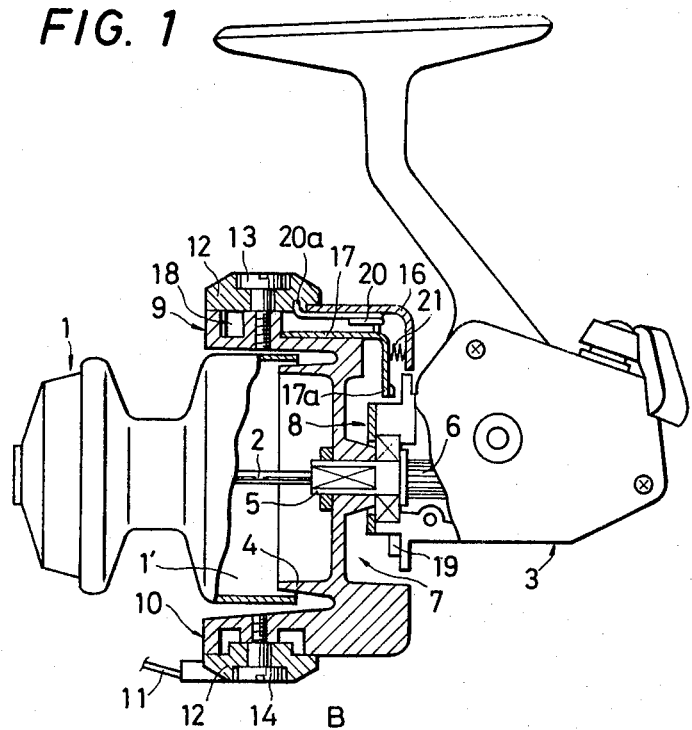
FIG. 1 is a fragmentary-cross-sectional view according to a first embodiment of the present invention.

A first embodiment according to this invention is shown in FIG. 1, wherein a pair of support housing 9 and 10 are symmetrically disposed on diametrically opposite sides of a rotor 4 which is mounted through a bearing 8 on a tubular shaft 5 to a reel body 3. The shaft 5 has a pinion 6 at one end and is rotated by a handle (not shown) coupled thereto by a main gear (not shown). A spool 1 is detachably supported by a main shaft 2 inserted into the tubular shaft 5. The main shaft 2 is reciprocable by a reciprocating mechanism (not shown) in synchronism with the main gear to reciprocate the spool 1. Both ends of a bail arm 11 are coupled to rotary discs 12, each rotary disc being rotatably mounted on respective support housings 9, 10 by shouldered step screw 13, 14. The rotor 4 is rotationally positioned within a cylindrical portion 1' of the spool 1. The bearing 8 is positioned in a recessed portion 7 formed at the rear portion of the rotor 4.

Figure 2:
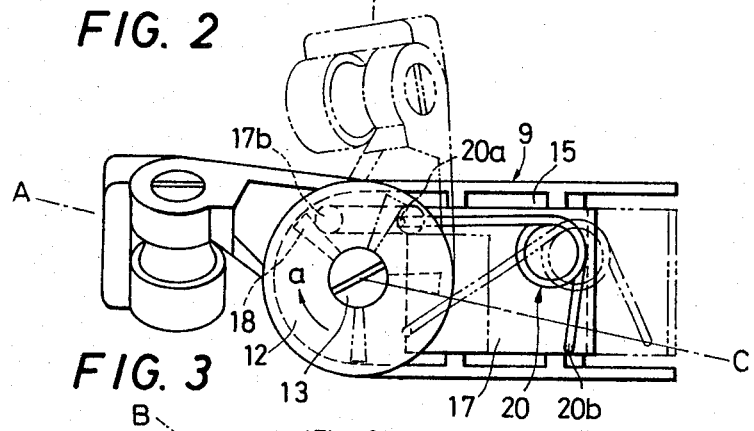
FIGS. 2 and 3 show plain views of a bail latching and releasing mechanism according to the first embodiment of this invention and modified embodiment, respectively.

According to the present invention, a bail latching and releasing mechanism is accommodated in one of the support housings. FIGS. 1 and 2 show the mechanism accommodated in the support housing 9. The support housing 9 is formed with a recessed portion 15 having its rear end opened to the recessed portion 7 of the rotor 4 as shown in FIG. 1. Furthermore, an opening of the recessed portion 15 is covered with a lid member 16 as shown in FIG. 1. Within the recess 15, a generally L-shaped kick lever 17 is slidably disposed along an axial direction of the rotor 4. The kick lever 17 has one end 17a oriented radially inwardly into the recessed portion 7 of the rotor 4, and has the other end 17b oriented along an axial direction of the rotor 4.

One of the rotary discs 12, rotatably secured to the support housing 9, has a bottom or inner face integrally provided with a boss 18. The boss 18 is directed along a radial direction of the disc 12 as shown in FIG. 2. The other end 17b of the kick lever 17 is brought into abutment with the boss 18. When the bail arm 11 is manually shifted from its fishing line rewinding position A (shown by a solid line in FIG. 2) to fishing line releasing position B (shown by two dotted-chain line) to rotate the rotary disc 18 along the direction shown by an arrow a, the kick lever 17 is forcibly moved in the axial direction of the rotor toward the rear side of the reel (toward the right side in the drawing) because of the abutment between the lever end 17b and the boss 18. Furthermore, the radially oriented lever end 17a can be brought into abutment with an operation cam 19 fixedly mounted on the bearing portion 8. The rotational locus of the lever end 17a is in alignment with the stationary operation cam 19 when the kick lever 17 is at its rearward position to provide the abutment.

Further, within the recess 15 of the support housing 9, a dead-point spring 20 is interposed. The dead-point spring 20 has one end 20a interlocked with the bottom face of the rotary disc 12, and the other end 20b interlocked with the kick lever portion adjacent to a bent portion thereof. A dead point of the dead-point spring 20 is defined at the position shown by a dotted-chain line C. Therefore, when one end 20a of the dead-point spring 20 passes over the dead point, the rotary disc 12 is urged toward the moving direction of the one end 20a.

Furthermore, a compression spring 21 is interposed between the kick lever 17 and the lid 16 along the axial direction of the rotor in order to urge the kick lever towrd the front side of the reel to thus provide abutment between the kick lever end 17b and the boss 18. The biasing force of the spring 21 is smaller than that of the dead-point spring 20.

With this structure, when the bail arm 11 is at the fishing line rewinding position A, the kick lever 17 is positioned at an advancing position as shown by solid and broken lines in FIG. 2 by the biasing force of the dead-point spring 20 and the compression spring 21. In this case, the rotational locus of radial end 17a of the kick lever 17 is displaced from the operation cam 19, so that the abutment between the end 17a and the cam 19 is not provided. Therefore, the fishing line is wound around the spool 1 during free rotation of the rotor 4 given by the handle (not shown).

Then, when the bail arm 11 is manually shifted to the fishing line releasing position B, the rotary disc 12 is rotated toward the direction shown by the arrow a, so that the boss 18 is also rotated toward the direction a to thus urge the kick lever 17 rearwardly as shown by a two-dotted chain line in FIG. 2. In this case, the rotational locus of the radial end 17a is brought into alignment with the operation cam 19. Further, in this case, since the one end 20a of the dead-point spring 20 is interlocked with the rotary disc 12, the dead-point spring 20 is shifted from the position shown by a solid line to the position shown by a two-dotted chain line in FIG. 2. Upon the one end 20a exceeding the dead point C, the rotary disc 12 is further urged to rotate along the direction shown by the arrow a to maintain the bail arm at its fishing line releasing position. The other end 20b of the dead-point spring 20 is at the dead point C upon completion of the shifting of the spring 20. In this case, since the compression spring 21 is compressed, and since the dead-point spring is shifted, the bail arm turning force is potentially accummulated for shifting the bail arm toward its fishing line rewinding position.

Thereafter, when the handle is rotated to rotate the rotor 4, the kick lever end 17a is directly brought into abutment with the operation cam 19, so that the kick lever 17 is kicked to move frontwardly against the biasing force of the dead-point spring 20. The movement of the kick lever causes the rotary disc 12 to rotate toward the direction opposite to the arrow a because of the abutment between the boss 18 and the tip end 17b, during which the one end 20a of the dead-point spring 20 is shifted from the position shown by the two dotted-chain line to the position shown by the solid line to pass over the dead point C. Upon the end 20a exceeding the dead point, the rotary disc 12 is further urged to rotate toward the direction opposite to the arrow a by the biasing force of the dead-point spring 20 and the compression spring 21, resulting in that the bail arm 11 is maintained at its fishing line rewinding position A. Therefore, the bail arm is automatically shifted from its fishing line releasing position to its rewinding position by the rotation of the handle.

Figure 3:
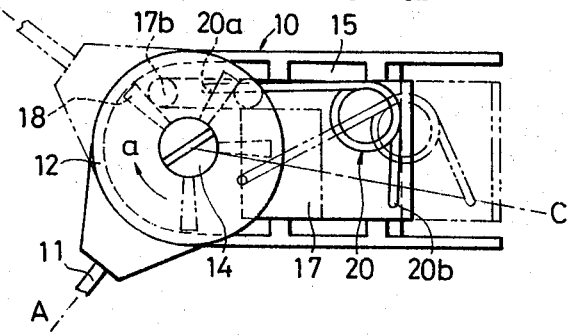

FIG. 3 shows a modified embodiment, wherein the bail latching and releasing mechanism is provided in the other support housing 10. According to this embodiment, the structure and associated function are the same as that described in the foregoing embodiment.

Figure 4:
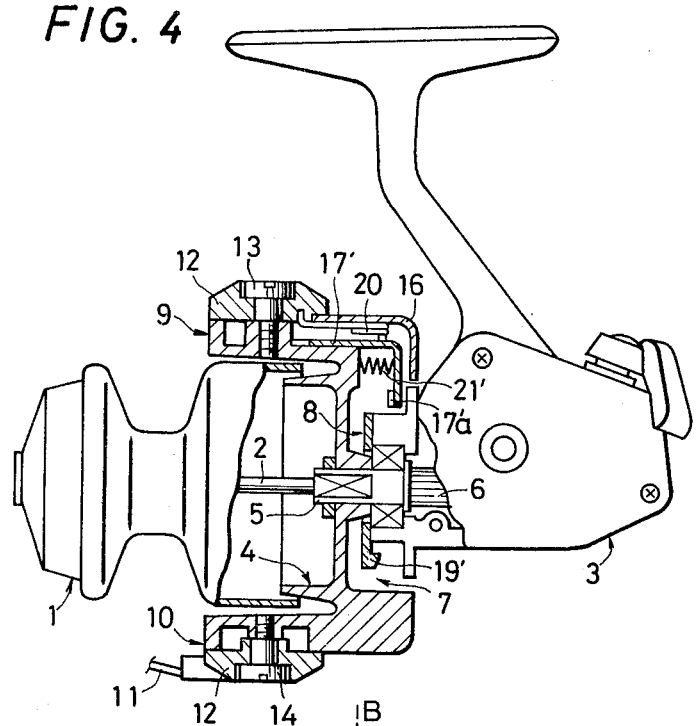
FIG. 4 is a fragmentary-cross-sectional view according to a second embodiment of the present invention.
Figure 5:
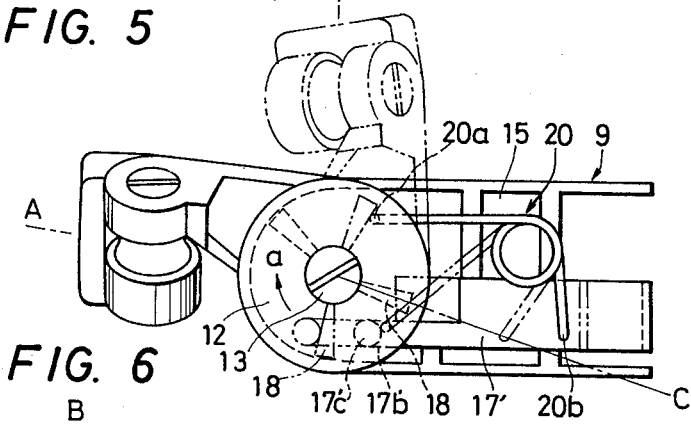
FIGS. 5 and 6 show plain views of a bail latching and releasing mechanism according to the second embodiment of the invention and modified embodiment, respectively.
Figure 6:
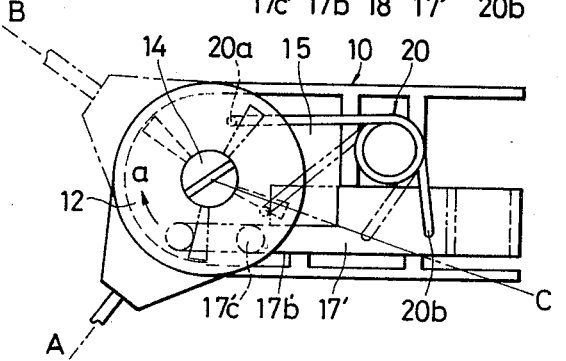

A second embodiment according to this invention is shown in FIGS. 4 through 6, wherein like parts and components are designated by the same reference numerals and characters as those shown in the first embodiment. According to the second embodiment, the abutment between kick lever 17' and an operation cam 19' is occurred when the kick lever 17' is at a frontward position as opposed to the first embodiment. In other words, when the bail arm 11 is the fishing line rewinding position A, the kick lever is at the rearward position, while when the bail arm 11 is at fishing line releasing position B, the kick lever is at frontward position, as opposed to the first embodiment.

To be more specific, a kick lever portion 17'b, extending parallel to the shaft 2, has an upstanding projection 17'c adapted to be lockingly engaged with the boss 18. Therefore, when the bail arm 11 is manually shifted from its fishing line rewinding position shown by a solid line in FIG. 5 to fishing line releasing position B shown by a two-dotted chain line, the rotary disc 12 is rotated toward the direction shown by the arrow a to move the kick lever 17' frontwardly (left side in the drawing). In this case, the radially oriented bent portion 17'a of the kick lever 17' is shifted so as to permit it to be brought into abutment with the operation cam 19'.

Further, a compression spring 21' is interposed in parallel with the shaft 2 between the rotor 4 and the bent portion 17'a of the kick lever 17' in order to urge the kick lever 17' rearwardly.

With the structure, when the bail arm 11 is at the fishing line rewinding position A, the kick lever 17' is positioned rearwardly as shown by the solid and broken lines in FIG. 5 by the biasing force of the dead-point spring 20 and the compression spring 21', during which the bent portion 17'a is offset from the operation cam 19'.

When the bail arm 11 is manually shifted to its fishing line releasing position B, the rotary disc 12 is rotated toward the direction shown by the arrow a to move the kick lever 17' frontwardly as shown the two-dotted chain line in FIG. 5 because of the locking engagement between the boss 18 and the projection 17'c against the biasing force of the springs 20 and 21'. In this case the bent end 17'a of the kick lever 17' is moved so as to be brought into abutment with the operation cam 19'. Further, in this case, one end 20a of the dead-point spring 20 exceeds the dead point C to further urge the rotary disc 12 to rotate to the direction a, to thereby maintain the bail arm at its fishing line releasing position. The other end 20b of the bail arm is positioned at the dead point as shown. Therefore, the compression spring 21' is compressed to provide potential bail turning force together with the biasing force of the dead-point spring 20 for turning the bail arm toward the fishing line rewinding position.

Thereafter, when the handle is rotated to rotate the rotor 4, the kick lever end 17'a is directly brought into abutment with the operation cam 19', so that the kick lever 17' is kicked to move rearwardly against the biasing force of the dead-point spring 20. The movement of the kick lever 17' causes the rotary disc 12 to rotate toward the direction opposite to the arrow a because of the locking engagement between the projection 17'c and the boss 18 during which one end 20a of the dead-point spring 20 reversely passes over the dead point C, so that the rotary disc 12 is further urged by the opposite biasing force of the spring 20 to rotate toward the direction opposite to the arrow a to maintain the bail arm 11 at its fishing line rewinding position. This bail turning force is also aided by the biasing force of the spring 21'. Therefore, the bail arm is automatically shifted from its fishing line releasing position to rewinding position by the rotation of the handle.

FIG. 6 shows modified embodiment wherein the bail latching and releasing mechanism is provided in the other support housing 10. According to the embodiment, the structure and associated function are the same as those of the embodiment shown in FIGS. 4 and 5.

In view of the foregoing, the bail latching and releasing mechanism of the present invention has fewer mechanical parts, requiring only the kick lever, the dead-point spring and the compression spring. The mechanism can be accommodated in either one of the support housings so that the assembling work becomes easy, the production cost is lowered, and a compact fishing reel is obtainable to enhance a fishermen's preference. Moreover, the dead-point spring serves to provide bail turning force as well as to selectively maintain the bail arm in its fishing line releasing or rewinding position, so that any mechanical adjustment after assemblage is not required, yet providing excellent bail latching and releasing operation. Furthermore, since the kick lever is further urged toward one direction by the compression spring, stabilized operation is obtainable. For example in the second embodiment, since the kick lever is urged rearwardly by the compression spring so as to provide a given axial distance between the kick lever and the operation cam, the kick lever may not be pivotted or abutted onto the cam during high speed fishing line rewinding operation. Furthermore, the compression spring accumulates potential bail turning force in its compressed state to aid the reversal rotation of the rotary disc.

While the invention has been described in detail and with reference to specific embodiments thereof, it will be apparent to one skilled in the art that various changes and modifications can be made thereto without departing from the spirit and scope of the invention.

What is claimed is:

1. An outer spool type spinning reel of the type including a bail arm pivotably mounted at both ends to support housings positioned at diametrically opposite sides of a rotor for swinging movement of the bail arm thereacross between fishing line releasing and rewinding positions, and bail support members each coupled to said respective ends of said bail arm, said bail support members being rotatably secured to said respective support housings, the improvement comprising a bail arm latching and releasing mechanism assembled in either one of said support housings, said bail arm latching and releasing mechanism comprising:

(a) a kick lever secured in said one of said support housings, said kick lever being slidable along an axial direction of said rotor, (b) a dead-point spring having one end connected to said kick lever and the other end connected to one of said bail support members disposed on said one of said support housings to selectively bias said bail arm toward its fishing line releasing and rewinding positions, (c) a compression spring connected to said kick lever and extended along the axial direction of said rotor, said one of said bail support members having a bottom face provided with a boss to provide urging force to said kick lever and said other end of said dead-point spring and to receive urging force therefrom, and (d) an operation cam secured to a stationary portion of a reel body, said operation cam being adapted to displace said kick lever when said bail arm is at the fishing line releasing position in order to rotate said one of said bail support members, to thus urge said bail arm from its fishing line releasing position to its rewinding position, said displacement of said kick lever also displacing said one end of said dead-point spring causing a dead-point line of said dead-point spring to also be displaced.

2. The improvement of claim 1, wherein said kick lever is of generally L-shape, the front portion of said kick lever being oriented parallel to the axial direction of said rotor and the rear portion thereof being radially inwardly extended to abut against said operation cam.

3. The improvement of claim 1 or 2, wherein said front portion of said kick lever is abutted on said boss, and said kick lever is urged toward said boss by said compression spring.

4. The improvement of claim 3, further comprising a lid member adapted to cover said one of said support housings, said compression spring being interposed between said rear portion of said kick lever and said lid member.

5. The improvement of claim 3, wherein said operation cam is positioned behind said rear portion of said kick lever so that said rear portion of said kick lever is brought into abutment with said operation cam when said kick lever is rearwardly shifted.

6. The improvement of claim 1 or 2, wherein said front portion of said kick lever is provided with an upstanding projection to provide locking engagement with said boss when said bail arm is shited from its fishing line rewinding to its releasing position, and wherein said kick lever is urged rearwardly by said compression spring.

7. The improvement of claim 6, wherein said compression spring is interposed between said rear portion of said kick lever and said rotor.

8. The improvement of claim 6, wherein said operation cam is positioned in front of said rear portion of said kick lever so that said rear portion of said kick lever is brought into abutment with said operation cam when said kick lever is frontwardly shifted.

9. The improvement of claim 1, wherein said dead-point spring has a central dead point between fishing line releasing and rewinding positions of said bail arm.

* * * * *